Figure 1:
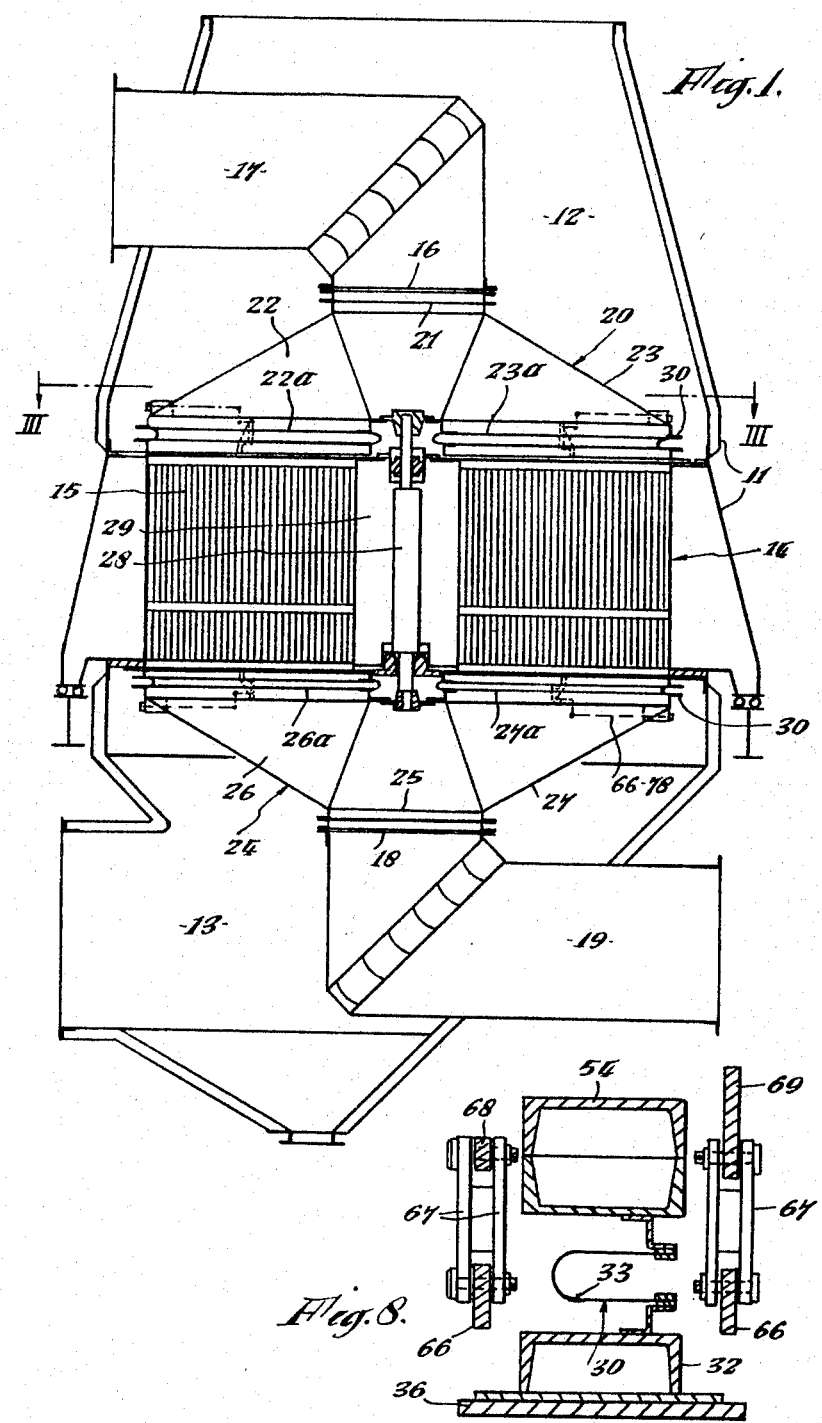

Inventors
Herbert Brandt
Herbert Sandmann
by Jacks & Jacks
Attorneys

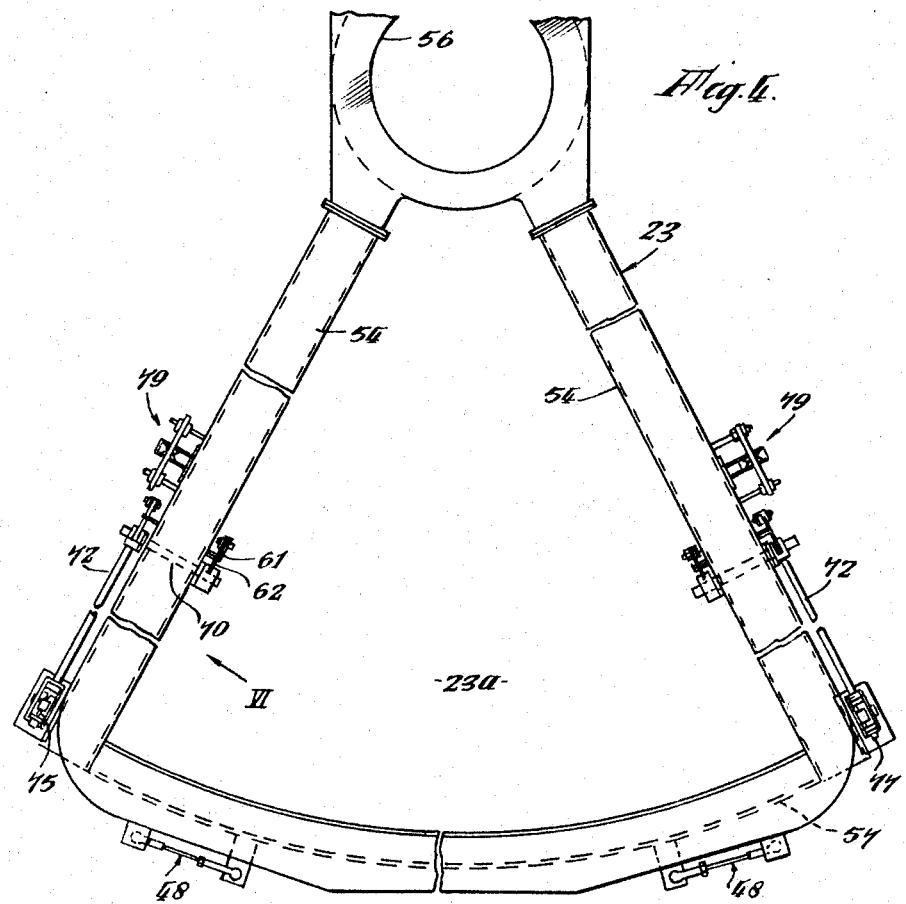
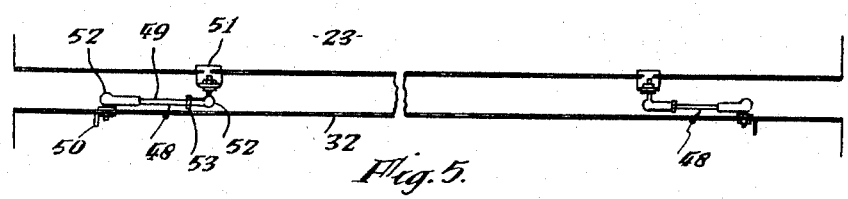

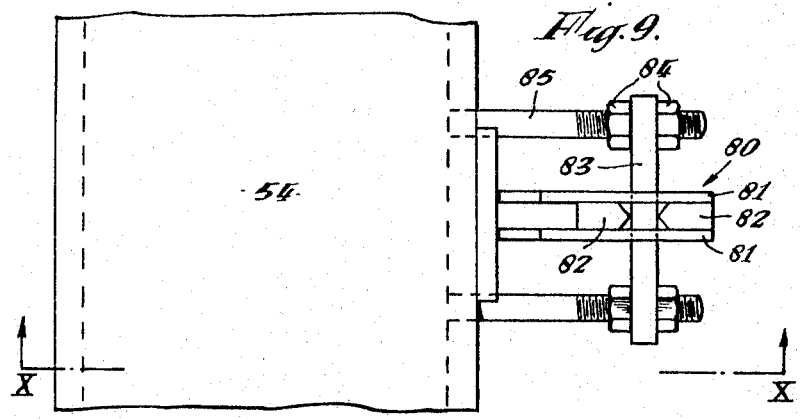
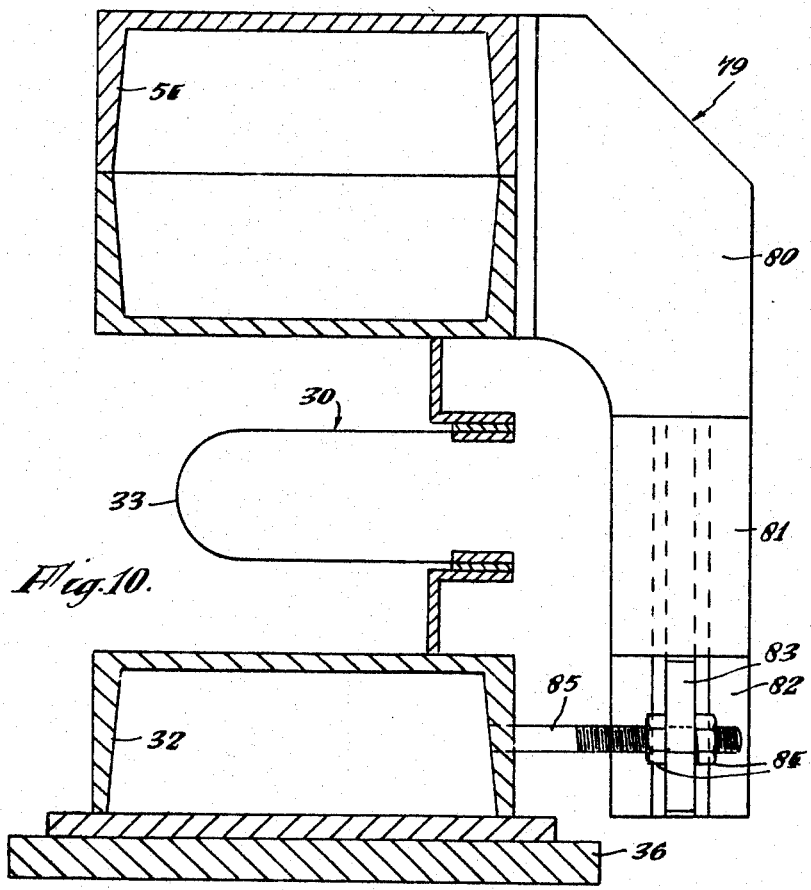

United States Patent Office 3,321,010
Patented May 23, 1967

3,321,010
ROTARY VALVE REGENERATIVE HEAT
EXCHANGER SEAL
Herbert Brandt, 5961 Rothemuhle uber Olpe, Westphalia, Germany, and Herbert Sandmann, Hubertusweg, 596 Olpe, Westphalia, Germany
Filed July 8, 1965, Ser. No. 470,376
Claims priority, application Germany, July 30, 1964,
A 46,730; Nov. 10, 1964, A 22,734
10 Claims. (Cl. 165—4)

This invention realtes to rotary regenerative heat exchangers of the kind in which a substantially cylindrical regenerative heat exchange member, hereinafter referred to as a regenerator, is disposed stationary within an outer casing which has gas inlet and gas outlet means at its ends or otherwise suitably located whereby hot gas may be led to the regenerator and passed in an axial direction through passages in the regenerator so as to give up heat from the said hot gas to a mass of plates or tubes which form the passages. Also disposed within the casing, and at each axial end of the regenerator, are rotatable air duct members provided with means to lead air to one of the said duct members and from the other said duct member after passing in an axial direction through the regenerator, the duct members rotating co-axially in relation to the stationary regenerator and having openings which pass over the end surfaces of the regenerator during such rotation, the opening or openings in one of the two air duct members being disposed in mirror-image relation to the opening or openings in the other duct member so that air may flow direct from one duct member, through part of the regenerator mass to pick up heat from said mass, and then into the other duct member.

Usually the said openings in the duct members are of sector shape, and there may be one or more such openings in each duct member.

It is desirable that the ends of the rotatable air duct members which sweep over the ends of the stationary regenerator should do so in such manner that there is the minimum amount of leakage between the duct members and the enclosing casing, and usually this is effected by spring-pressed sealing members disposed at and around the edges of said air duct openings so as to be pressed into contact with the end surfaces of the regenerator, a gas-tight flexible and resilient expansion joint device being disposed between the edges of the air duct openings and the sealing members. Swivelling joint means also are provided between the rotatable air duct member and the sealing member so that the rotatable drive applied to the duct member may be transmitted to the sealing member independently of the expansion joint device and the spring-pressure means.

It also has been proposed that the shaft which passes axially through the stationary regenerator and is connected to the two rotatable air duct members should be in two parts provided with axially movable means to allow the two air duct members and their sealing members to be retained in sealing engagement with the end surfaces of the regenerator during all phases of heat expansion.

The radial parts of the frame of each rotatable air duct member, at the said opening thereof, have been flexibly connected to a ring-shaped central frame part of the duct member so that the sealing member could adapt itself to any distortion of the end surface of the stationary regenerator due to unequal heat expansion. However, experience has shown that with the predominantly bigger air preheaters now being designed, with regenerators having a diameter in the region of 10 m. to 12 m., the arrangement does not always allow for sufficient adaptation of the sealing members to the end surface of the regenerator which becomes somewhat arched on account of expansion due to heat.

The object of the present invention is to provide improvements in the sealing member whereby it can better adapt itself to distortion of the end surface of the regenerator.

According to this invention, a rotary heat exchanger comprising a casing, a hot gas inlet chamber at one end of the casing, a gas outlet chamber at the other end of the casing, a stationary regenerator within said casing between said chambers, a mass of plates in said regenerator providing a multiplicity of axial passages therethrough, an outlet air duct one open end of which is disposed within said gas inlet chamber, an inlet air duct one open end of which is disposed within said gas outlet chamber, rotatable air duct members at each axial end of said regenerator and having necks disposed in rotatable air and gas tight engagement with the open ends of the inlet and outlet air ducts, each air duct member having ducts with openings at the ends adjacent the axial ends of said regenerator whereby air emitted from said inlet air duct passes through said regenerator into said outlet air duct, and sealing assemblies disposed around the peripheries of the openings of said air duct members, said sealing assemblies comprising a sealing member, a frame attached to said sealing member, an expansion member between said air duct member and said sealing member frame, swivel joint means between said air duct member and said sealing member frame for transmitting the rotational movement of said air duct member to said sealing member, and resilient means urging said sealing member frame from said air duct member toward said regenerator, is characterised in that the arms of the sealing member frame which extend substantially radially from the axis of rotation of the air duct member are divided substantially medially of their ends to provide two parts which are connected together flexibly.

Figure 2:
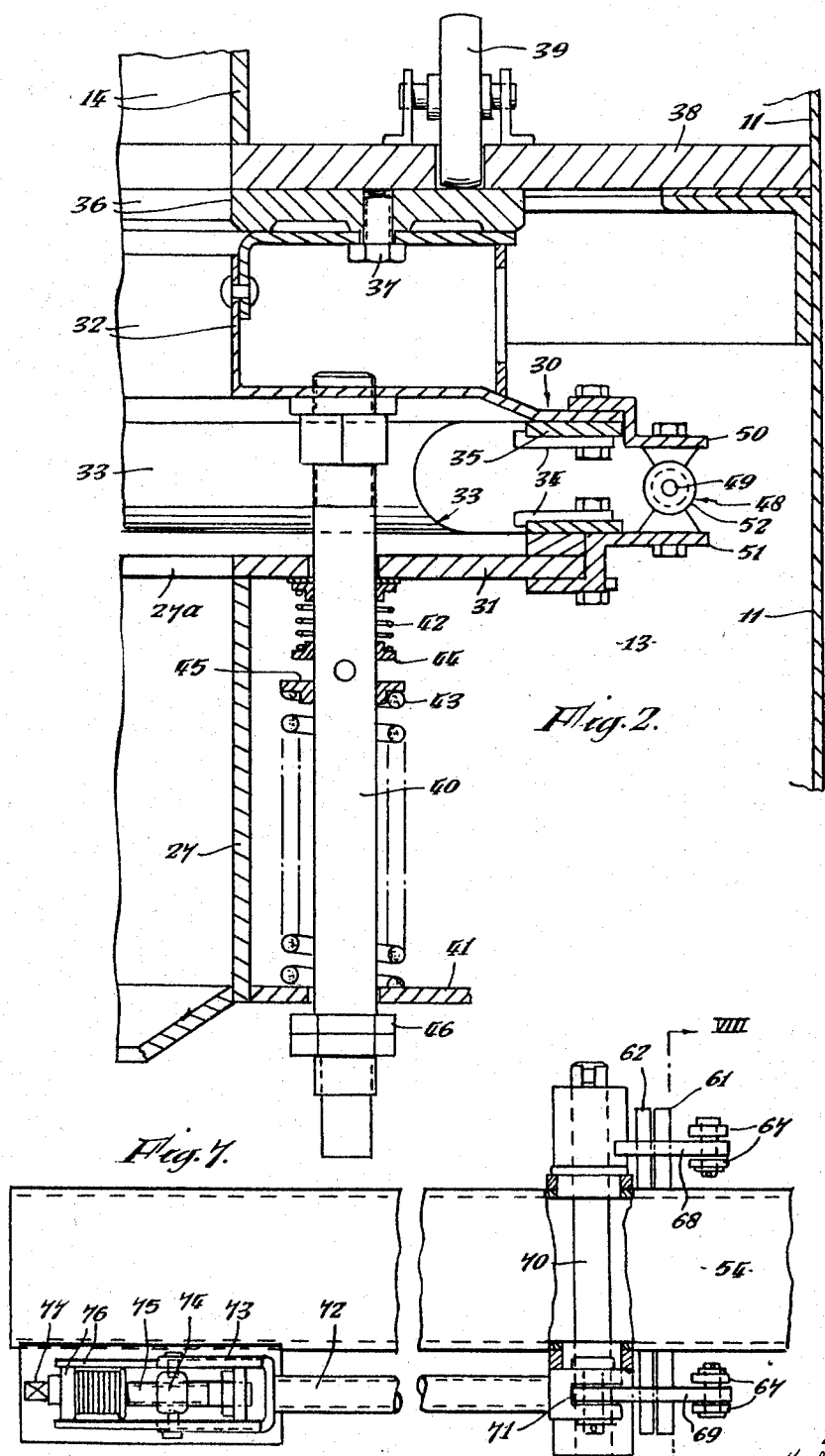
Figure 3:
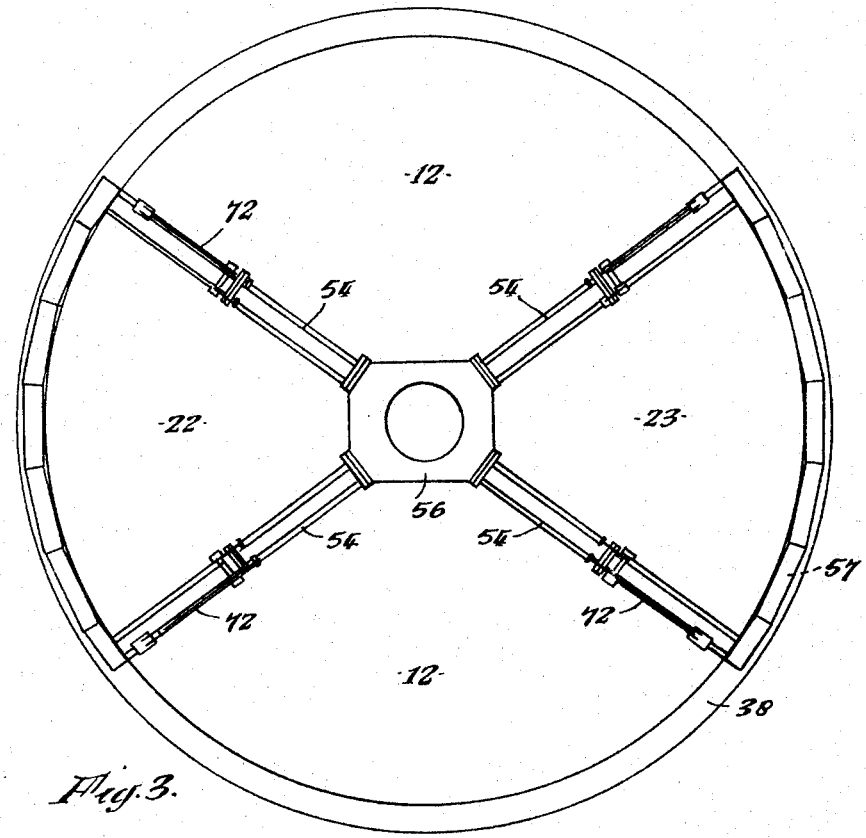
Figure 6:
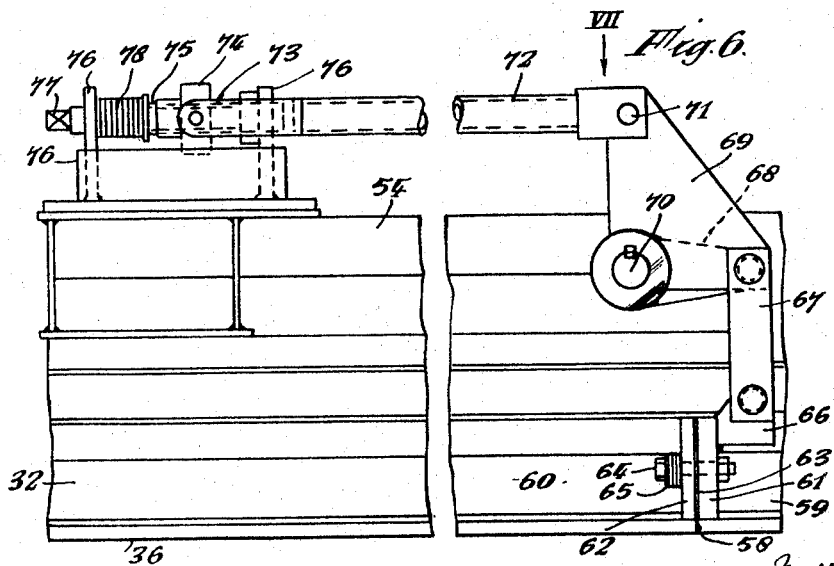

In the accompanying drawings:
FIG. 1 is a sectional elevation of a rotary regenerative heat exchanger embodying one form of the invention;
FIG. 2 is an enlarged sectional elevation of a part of FIG. 1;
FIG. 3 is a plan view, taken on line III—III of FIG. 1, of a pair of diametrically opposed rotatable air duct members;
FIG. 4 is an enlarged plan view of a part of FIG. 3;
FIG. 5 is an end elevation of part of an air duct member and a sealing member mounted thereon, looking in the direction of arrow V in FIG. 4;
FIG. 6 is a fragmentary side elevation looking in the direction of arrow VI in FIG. 4;
FIG. 7 is a plan view, looking in the direction of arrow VII in FIG. 6;
FIG. 8 is a transverse sectional elevation, taken on line VIII—VIII in FIG. 7;
FIG. 9 is an enlarged plan view of part of FIG. 4; and
FIG. 10 is a transverse sectional elevation, taken on line X—X in FIG. 9.

Referring to FIG. 1, a casing 11 provides at its top end a chamber 12 into which hot gases, from a suitable source, are admitted by means not shown, and the casing also has at its bottom end a chamber 13 from which the said gases, after giving up heat to the regenerator hereinafter referred to, are withdrawn by means not shown.

Between the chambers 12 and 13 there is a stationary cylindrical regenerator 14 which is provided with plates or tubes which provide a mass 15 which forms passages which are open at the axial ends of the regenerator. Thereby, the hot gas from the chamber 12 may flow through the mass 15, give up heat to the mass, and then pass on, as cool gas, to the chamber 13.

Within the chamber 12, and co-axial with the regenerator 14, there is the open end 16 of an outlet air duct 17, while within the chamber 13 there is a similar open end 18 of an inlet air duct 19.

Above the regenerator 14 there is an air duct member 20 which has an axial neck 21 which is disposed in rotatable, air and gas tight, engagement with the end 16 of the air duct 17, and has ducts 22 and 23 which have sector-shaped openings 22a and 23a respectively at their lower ends near to the top end face of the regenerator 14.

Similarly, below the regenerator 14 there is an air duct member 24 which has an axial neck 25 which is disposed in rotatable, air and gas tight, engagement with the end 18 of the air duct 19, and has ducts 26 and 27 which have sector-shaped openings 26a and 27a respectively at their upper end near to the bottom end face of the regenerator 14.

The top openings 26a and 27a of the ducts 26 and 27 are opposed, in the axial direction of the regenerator, to the bottom openings 22a and 23a of the ducts 22 and 23, respectively, that is, the openings 26a and 27a of the ducts 26 and 27 are disposed in mirror-image manner to the openings 22a and 23a of the ducts 22 and 23, so that air emitted from the ducts 26 and 27 will pass through the regenerator and into the ducts 22 and 23.

The two air duct members 20 and 24 are both secured to a driving shaft 28 which passes vertically through an axial opening 29 in the regenerator 14 to provide a rotation drive to the duct members in known manner.

It is desirable that there be no leakage of fluid between the air ducts 22, 23, 26, 27 and the gas chambers 12, 13, and for this purpose sealing assemblies 30 are disposed around the peripheries of the openings 22a, 23a, 26a and 27a of the ducts 22, 23, 26, 27. The sealing assembly applied to the air duct 27 is shown in detail in FIG. 2.

A flange 31 surrounds the upper opening 27a of the air duct 27, and a frame 32 coincides with the flange. An expansion member 33, having a section of U shape, and made of comparatively thin flexible and resilient material, for example spring steel, is secured at its edges in a gas-tight manner by clamps 34 (not wholly shown) and packing strips 35 to the flange 31 and to the frame 32.

The frame 32 also has a metal sealing strip 36 secured to it by screw studs 37, and the sealing strip slides, during rotation of the duct members, on the surfaces of a flange 38 and on the end surfaces of the radial ribs of the regenerator 14 and of the filling mass of the regenerator. Rollers 39, mounted externally on the regenerator, project through the flange 38 to engage the sealing strip 36 and assist the sliding movement between the sealing strip 36 and the flange 38 and the ribs and mass of the regenerator.

Bolts 40, spaced apart at suitable intervals around the sealing assembly, are screwed into the frames 32, and pass freely through the flange 31 on the air duct 27 and also through a second flange 41 on the air duct. Helical compression springs 43 are disposed around the bolt 40 and between the flange 41 and a cup member 45 on the bolt. Thus, the frame 32 together with the sealing strip 36 is constantly urged by the springs 43 towards the regenerator 14. Stop nuts 46 on the bolt abut the flange 41 in order to limit the movement of the bolt, and by adjustment of those nuts on the bolt it is possible to limit wear of the sealing strip 36 during an initial running-in period. The pressure of the springs 43 on the sealing strip 36 can be adjusted by rotating the screwed bolt 40 in the frame 32. Damper springs 42 are disposed between the flange 31 and other cup members 44 on the bolts.

The frame 32 and the air duct 27 (22 and 23 in FIG. 3, or 23 in FIGS. 4 and 5) also are connected to each other by swivelling connections 48 which comprise a rod 49 connected at its ends by ball-joints to brackets 50 and 51 secured, respectively, to the frame 32 and the air duct 23 (FIGS. 4 and 5). The length of the rod 49 can be adjusted by screwing it into or out of the ball socket elements 52 and locking it by lock nuts 53.

Such an arrangement and mounting of the sealing frame 32 and of the sealing strip 36 does not completely allow the sealing strip 36 to accommodate itself to the distortion of the end surfaces of the filling mass 15, due to heat, when the regenerator is of large diameter, for example in the region of 10 m. to 12 m.

Accordingly the parts of the sealing frame 32 which extend along the radial portions 54 (FIG. 4) of the air duct member frame which carries, around the opening 23a (or 22a, 26a, 27a), the radial portions of the sealing frame, are divided approximately midway between the central ring 56 (which encircles the shaft 28) and the circumferential part 57, and a flexible connection is provided at this division of the sealing frame.

As shown in FIG. 6, the sealing frame 32, along radial portion 54 of the duct opening frame, is divided at 58 into portions 59, 60, the portion 59 extending from the central ring 56 and the portion 60 extending to the circumference 57. At the dividing place 58 the sealing frame portions 59, 60 are provided with flanges 61, 62, respectively, having a plate 63 between them and connected together by a screw bolt 64 provided with resilient packing means 65 such as cup springs. Thereby, the outer portions 60 together with the circumferential portion 57 of the sealing frame can move slightly relative to the portion 59 and thus more effectively allow the sealing strip 36 to accommodate itself to distortion of the end surfaces of the regenerator 14 and of the filling mass 15 therein.

The flange 61 of each sealing frame portion 59 is connected by lugs 66 thereon and links 67 to levers 68 and 69 which are pivotally mounted on a spindle 70 mounted transversely of the portion 54 of the duct opening frame. One of the levers, 69, is a plate lever, and it is connected at 71 to one end of a rod 72 which extends along the radial frame portion 54 towards the circumferential portion of the frame. At its outer end, the rod 72 is provided with a stirrup 73 the ends of which are connected to a nut 74 which is engaged by an adjusting bolt 75. The bolt 75 is mounted rotatably, but immovable axially, in and between brackets 76 formed as a trestle and secured to the frame portion 54, and rotation of the bolt, by means of a spanner applied to the outer end 77 thereof, will adjust the position of the rod 72 and the linkage 66–69 with the sealing frame when it is desirable to incline the radial sealing frame portions 59 and 60 relative to each other, thereby adapting said sealing means more closely to warping of the regenerator end surfaces. The connection of the rod 72 to the frame portion 54 is resilient through springs 78, which may be cup springs, on the bolt 75. A door in the outer casing 11 will allow access, from the outer side of the heat exchanger, to the bolt end 77 for adjustment of the rod 72.

The provision of the swivel joints 48 on the outer circumferential portions 57 of the sealing frame in large air preheaters results in a large elasticity of the sealing frame portions 59, 60 and a large deflection thereof in the direction opposed to the direction of rotation of the duct members, due to the friction between the sealing strips 36 and the end surfaces of the regenerator 14. As a result, tangential stresses are transmitted to the expansion members 33 which may lead to such expansion members being damaged. In order to avoid such disadvantages, additional drag link devices 79 connecting the radial portions 54 of the duct opening frame and the sealing frame 32 are provided, as shown in FIGS. 4, 9 and 10.

There is a drag link device located substantially medially of the length of each radial portion 54 of the duct opening frame, that is, in the vicinity of the flexible division 58 between the parts 59 and 60 of said frame radial portion, but other such drag link devices may be located at other positions along the radial portions 54 of the duct opening frame.

Each drag link device 79 comprises (FIGS. 9 and 10) a cantiliver 80 secured to the member 54 and extending to the outside edge of the sealing frame 32. Each cantilever 80 comprises two plates 81 spaced apart and parallel to each other and having disposed between them, at their free ends, a pair of V-shaped jaws 82, the V-edges of the two jaws being directed towards each other and being spaced apart. Between and in contact with the V-edges of the jaws 82 there is a plate 83 which is secured at its ends, by lock nuts 84, on two screw bolts 85 which project from the outer edge of the sealing frame 32. The edges at the apices of the V-edged jaws 82 may be rounded convexly with a radius of 5 mm.

Rotary movement of the duct member 20 or 24 will be transmitted by away of the radial members 54, cantilevers 80, jaws 82, and bolts 85 to the sealing frame 32, and thus will remove stresses from the expansion members 33.

The angular position of the sealing frame 32, relative to the duct opening frame portion or member 54, around the vertical axis of the heat exchanger, can be adjusted by means of the lock nuts 84 on the bolts 85.

Alteratively, the additional drag link devices may comprise swivel joints, similar to the swivel joints 48, disposed between the cantilevers 80 and the sealing frames 32.

As shown in FIG. 5, two swivel joints 48 may be disposed on the circumferential portions of the air duct frames and on the corresponding portions 57 of the sealing frames 32, with the pull rods 49 extending in opposite directions from the connections 50 thereof to the sealing frames 32; thereby, the duct members are exactly fixed relative to the sealing frames, in the circumferential direction, whilst allowing free movement of the sealing frame relative to the duct member in axial and radial directions. The lengths of the pull rods 49 should be at least so long that the angle of deviation, in the axial direction of the heat exchanger, does not exceed ±5°.

What we claim and desire to secure by Letters Patent is:

1. A rotary regenerative heat exchanger comprising a casing, a hot gas inlet chamber at one end of the casing, a gas outlet chamber at the other end of the casing, a stationary regenerator within said casing between said chambers, a mass of plates in said regenerator providing a multiplicity of axial passages therethrough, an outlet air duct one open end of which is disposed within said gas inlet chamber, an inlet air duct one open end of which is disposed within said gas outlet chamber, rotatable air duct members at each axial end of said regenerator and having necks disposed in rotatable air and gas tight engagement with the open ends of the inlet and outlet air ducts, each air duct member having ducts with openings at the ends adjacent the axial ends of said regenerator whereby air emitted from said inlet air duct passes through said regenerator into said outlet air duct, and sealing assemblies disposed around the peripheries of the openings of said air duct members, said sealing assemblies comprising a sealing member, a frame attached to said sealing member, an expansion member between said air duct member and said sealing member frame, swivel joint means between said air duct member and said sealing member frame for transmitting the rotational movement of said air duct member to said sealing member, and resilient means urging said sealing member frame from said air duct member toward said regenerator, wherein the sealing member frame has arms which extend substantially radially from the axis of rotation of the air duct member which arms are divided substantially medially of their ends to provide two parts which are connected together flexibly, said flexible connection comprising flanges on the adjacent ends of said two parts, a flat steel plate between said flanges, a screw bolt passing through said parts and said plate and resilient means disposed on said bolt.

2. A rotary regenerative heat exchanger according to claim 1, wherein the resilient means on the screw bolt are cup springs.

3. A rotary regenerative heat exchanger according to claim 1, wherein adjustment means are provided whereby the positions of the two parts of the divided radial arm of the sealing member frame relatively to each other, in particular the relative angle of deviation, can be adjusted.

4. A rotary regenerative heat exchanger according to claim 3, wherein the adjustment means comprises a lever device pivotally mounted on the frame of the air duct member, a lug rigidly secured to one of the flanges, links connecting said lug to one end of said lever device, the other end of said lever device being connected to a pull rod which extends along the air duct member frame to the outer periphery thereof where the other end of the pull rod is connected resiliently to said air duct member frame.

5. A rotary regenerative heat exchanger according to claim 4, wherein a trestle is mounted on the periphery of the air duct member frame, a screw bolt is mounted in said trestle for free rotation therein, a screw nut is mounted on said bolt, and the other end of the pull rod is connected to said nut, whereby adjustment of the relative positions of the two parts of the radial arm of the sealing frame can be effected by rotation of the screw bolt.

6. A rotary regenerative heat exchanger according to claim 5 wherein cup springs are disposed around the screw bolt and are disposed between one end of said trestle and a collar on said screw bolt.

7. A rotary regenerative heat exchanger according to claim 1, wherein between each said radial arm of the sealing member frame and the associated radial arm of the air duct member frame, and substantially medially of the ends of said radial arms, there is disposed a drag link device comprising a cantilever mounted rigidly on the said radial arm of the air duct member, a pair of V-edged jaws mounted rigidly on said cantilever, the V-edges of said two jaws being directed towards and spaced from each other, a plate disposed between and in contact with both of said V-edges, and screw bolts rigidly mounted on the radial arm of the sealing member frame, the screw bolts adjustably engaging the ends of said plate, to provide additional means for transmitting the rotational motion of the air duct member to the sealing member.

8. A rotary regenerative heat exchanger according to claim 7, wherein several of said drag link devices are disposed between each radial arm of the sealing member frame and the associated radial arm of the air duct member frame, at spaced intervals between the ends of said radial arms.

9. A rotary regenerative heat exchanger according to claim 7, wherein the said V-edges of the said jaws are rounded convexly with a radius of 5 mm.

10. A rotary regenerative heat exchanger according to claim 1, wherein each said swivel joint means comprises a pull rod which is adjustable in length, each end of said pull rod being attached to one element of a ball joint, the other ball joint element at one end of the pull rod being attached to the circumferential portion of the air duct member frame and the other ball joint element at the other end of the pull rod being attached to the circumferential portion of the sealing member frame, there being two said swivel joints at each peripheral portion of the air duct member frame, the ball joint element of one swivel joint device which is attached to the air duct member frame being at the end of the pull rod opposed to the position of the similar ball joint element on the pull rod of the other swivel joint device, the pull rods of the two swivel joint devices being so long, in relation to the axial spacing of the air duct member frame and the sealing member frame from each other that the range of swinging movement of the swivel joint devices in the axial direction of the heat exchanger is not more than ±5°.

References Cited by the Examiner

UNITED STATES PATENTS 3,250,316  5/1966  Nyberg _____ 165—9

FOREIGN PATENTS 1,143,959  2/1963  Germany.

ROBERT A. O'LEARY, *Primary Examiner.*

A. W. DAVIS, *Assistant Examiner.*